United States Patent [19]

Santo

[11] 4,103,375
[45] Aug. 1, 1978

[54] DECORATIVE WATERBED FRAME

[76] Inventor: Philip J. Santo, 130 Larkspur La., Rochester, N.Y. 14622

[21] Appl. No.: 805,583

[22] Filed: Jun. 10, 1977

[51] Int. Cl.² .................. F16B 12/00; A47C 27/08
[52] U.S. Cl. ........................... 5/282 R; 5/201;
5/305; 5/370; 403/205; 312/204
[58] Field of Search .................. 312/204, 320, 330;
248/345.1, 188, 188.1, 200, 201; 5/317, 282 R,
288, 304, 305; 403/205

[56] References Cited

U.S. PATENT DOCUMENTS

| 2,760,301 | 8/1956 | Derr et al. | 312/204 |
|---|---|---|---|
| 3,129,987 | 4/1964 | Hill | 312/320 |
| 3,585,356 | 7/1971 | Hall | 5/370 |
| 3,634,925 | 1/1972 | Van Loo | 248/345.1 |
| 3,999,236 | 12/1976 | Macauley | 5/370 |
| 4,014,618 | 3/1971 | Kristiansen | 248/188 |

*Primary Examiner*—Casmir A. Nunberg
*Attorney, Agent, or Firm*—Lawrence P. Kessler

[57] ABSTRACT

A modular decorative waterbed frame including a pair of side walls and a pair of end walls of uniform cross-sectional configuration. The uniformity of cross-section of the walls enables the walls to be produced by high volume production methods, and thence cut into different lengths for later assembly into frames of various sizes. The cross-section of the walls is in the shape of an I-beam. The upper and lower cross pieces of the I have opposing lips which form a support channel for decorative panels. The decorative panels, which may be configured to be compatible with any style or period of furniture, are fixed to the vertical portion of the I beam by any readily releasable fastener means. The side walls and end walls are interconnected by uniform corner members which also have decorative panels fixed thereto.

8 Claims, 3 Drawing Figures

U.S. Patent  Aug. 1, 1978  4,103,375
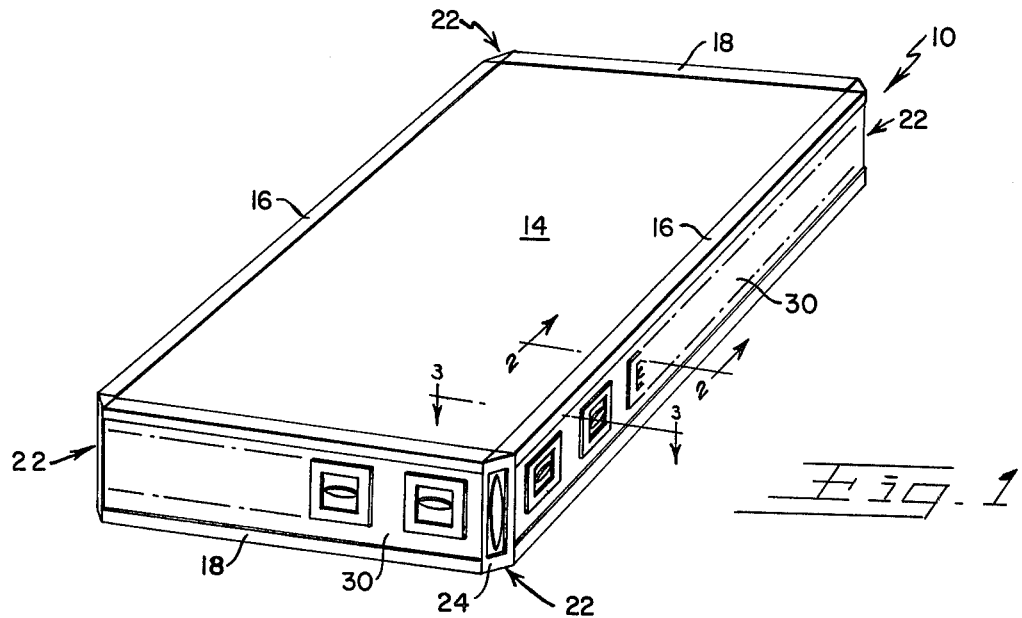
Fig. 1
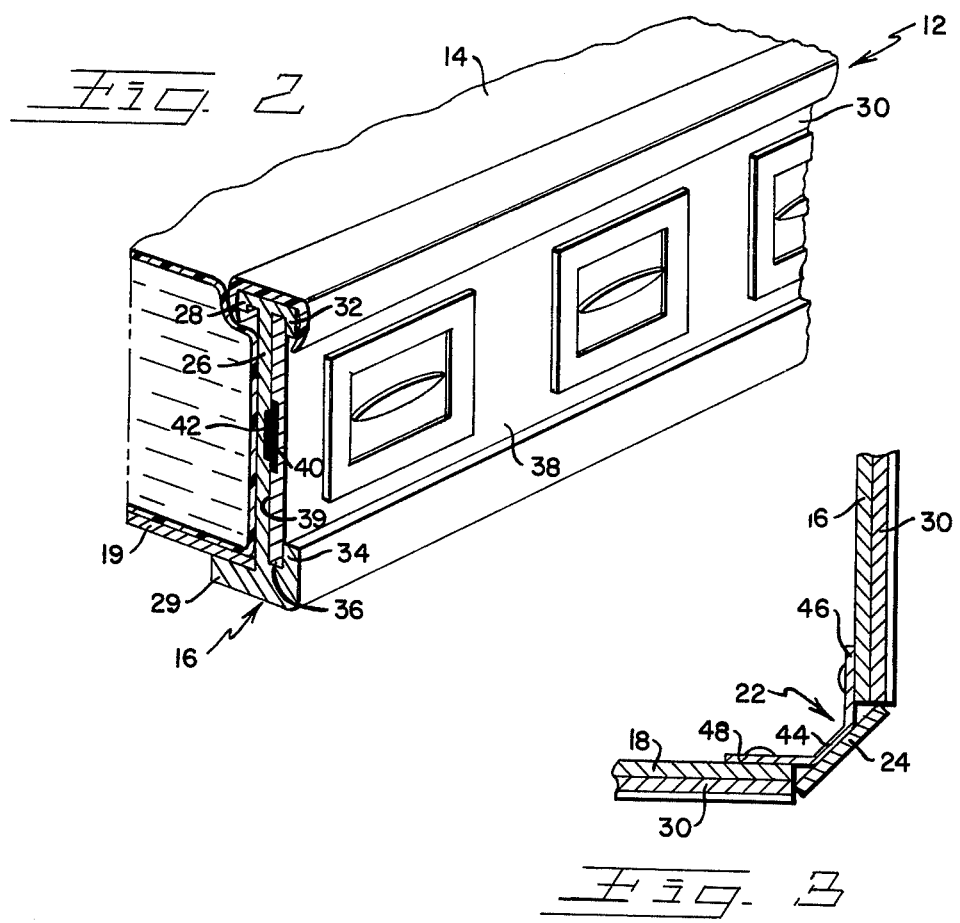
Fig. 2
Fig. 3

DECORATIVE WATERBED FRAME

BACKGROUND OF THE INVENTION

1. Field of the Invention

This invention relates to support structure for bedding, and more particularly to a waterbed frame with readily interchangeable decorative panels.

2. Brief Description of the Prior Art

In support structures for conventional bedding, including box spring and mattress sets, the frame supports are primarily constructed as interconnected metal channel rails upon which the perimeter of the box spring sits. The appearance of the frame is not considered of major importance since the bed is generally covered by a decorative skirt or bed spread. On the other hand, frame supports for waterbeds are box-like constructions which surround the flexible fluid-filled bladder forming the water-bed mattress. Such frame supports are readily adaptable to being formed from decorative materials and therefore need not be hidden under a decorative skirt. However, as is the case with the furniture industry in general, the decorative appearance of the furniture is selected to be of a particular style or period. In choosing furniture an individual usually decides on a basic style or period and then tailors all his furniture acquisitions to be compatible with that style. Due to the cost involved in changing from one style to another, the original selection of furniture style is usually maintained even though tastes of the individual may change or additional styles become available.

In order to give flexibility to the decorative design of furniture to accommodate desired style changes, some attempts have been made to provide interchangeable decorative members for the furniture frames. For example, in U.S. Pat. No. 3,546,725, U-shaped decorative panels are supported on a bed frame; and in U.S. Pat. No. 3,585,356, a decorative band surrounds the frame of a waterbed. In the example of U.S. Pat. No. 3,546,725 the panels are merely hung over the edge of the bed frame and are thereby susceptible to being easily knocked off or damaged. While the decorative band of U.S. Pat. No. 3,585,356 is more securely fixed to its frame, it does not offer the ready interchangeability of the first mentioned patent nor is it capable of assuming a desired variety of design configurations.

SUMMARY OF THE INVENTION

It is the purpose of this invention to provide a modular frame for a waterbed mattress of sturdy construction with readily interchangeable decorative side panels. The frame includes a plurality of elongated upstanding wall members of uniform cross-sectional configurations. The uniformity of cross-section of the wall members enables the walls to be produced in high volume production methods, and thence cut into various lengths for later assembly into frames of various sizes. The cross-section of the wall members is in the shape of an I-beam. The top and bottom cross pieces of the I have opposing lips which form a support channel for decorative panels. The decorative panels, which may be configured to be compatible with any style or period of furniture, are fixed to the vertical portion of the I beam by any readily releasable fastener means such as magnetic plates or "Velcero" type fasteners. The wall members are interconnected by uniform corner members which also have decorative panels fixed thereto. It is of course, understood that the frame could be utilized to support a conventional mattress system.

BRIEF DESCRIPTION OF THE DRAWINGS

FIG. 1 is a perspective view of a waterbed having a modular decorative waterbed frame constructed according to this invention;

FIG. 2 is a perspective view of a section of the decorative frame of FIG. 1, on an enlarged scale, taken on lines 2—2 of FIG. 1; and FIG. 3 is a plan view in section of the corner assembly of the decorative frame of FIG. 1.

DESCRIPTION OF THE PREFERRED EMBODIMENTS

Referring now to the drawings, FIG. 1 shows a waterbed 10 comprising a decorative frame 12 supporting a mattress, such as a flexible, fluid-containing bladder 14. The frame 12 has a pair of side walls 16, a pair of end walls 18 and a support floor 19 (see FIG. 2). The walls 16 and 18 carry readily removable decorative panels 30. Adjacent side walls and end walls are interconnected by corner members 22 (see FIG. 3) to form a generally rectangular frame construction surrounding the perimeter of the bladder 14 to give the bladder its required lateral support, while the floor 19 support the underside of the bladder. The corner members 22 also carry readily removable decorative panels 24.

The side walls 16 and end walls 18 are elongated members of uniform cross-sectional configuration. As best seen in FIG. 2, the walls are formed in the general shape of a I-beam 26, having upper and lower cross pieces 28 and 29. Opposing lips 32 and 34 are formed along respective edges of the upper and lower cross pieces 28 and 29. The opposing lips 32 and 34 establish a support channel 36 for the decorative panels. The uniformity of cross-section enables the walls to be produced by high volume production methods such as by molding or extruding high strength plastic resins. The formed wall members are then cut into various lengths which may be readily assembled to form any given size frame 12 dependent upon the particular size bladder 14 to be supported.

The decorative panels 30 are configured to have an exposed face 38 compatible with any style or period of furniture. The panels may be made of wood, to give the frame the look of the finest wooden-framed furniture, or formed from a synthetic wood substitute. In fact the panels could be made from any desired material with the face being in any color and incorporating any chosen design. The rear face of the panel 39 has a fastener means 40 which releasably mates with a corresponding fastener coupling 42 carried by the vertical portion of the I-beam 26. The fastener means 40 and coupling 42 may be, for example, opposed strips of magnetically permeated material, or "Velcro" type fasteners. Thus, as can be readily seen in FIG. 2, the decorative panels 30 can be slipped into the panel 36 in a respective wall member and the fastener means 40 and coupling 42 will hold the panel securely in place until such time as it is desired to change to a decorative panel of different design or style.

The corner members 22 are also of standardized uniform construction. Each corner member 22 has a vertically oriented base 44, with outstanding portions 46 and 48 set at a 45° angle to the base 44. Thus the portions 46 and 48 can be interconnected by any well known coupling to respective side and end wall members to form a right angle between the members. In this manner a substantially rectangular frame may be established of a size to provide lateral support to the perimeter of a waterbed bladder of given size. The decorative panel 24 is releasably fastened to the outwardly facing surface of the base 44 with a similar fastener mechanism as used to fasten panels 30 to the side wall members. A c-shaped cap 46 of a protective material, such as smooth plastic, is force fitted over the upper cross piece 28 and the top of panel 24 to prevent injury to the user of the waterbed 10 or damage to the top of the frame 12.

From the foregoing it is apparent that there is herein provided a novel decorative waterbed frame of sturdy modular construction. The frame has elongated wall members of uniform configuration to permit the use of high volume production methods in their construction. The cross-section of the wall members is in the shape of an I-beam, with opposing lips of the cross pieces of the I forming a support channel for decorative panels. The decorative panels are configured to be compatible with any style or period of furniture. The wall members are selected to be of a desired length and are interconnected by uniform corner members to form the rectangular perimeter support frame for the waterbed bladder.

I claim:

1. A decorative frame of modular construction for supporting the perimeter of a mattress such as a flexible bladder for a waterbed, said decorative frame comprising:
   a plurality of upstanding elongated wall members of uniform cross-sectional configuration, said wall members having channel means formed along the longitudinal marginal edges thereof;
   a plurality of decorative panels supported in said channel means of said plurality of wall members respectively;
   means for releasably fastening a decorative panel to a respective wall member within the channel means thereof;
   a plurality of corner members of uniform configuration, said corner members interconnecting adjacent wall members at right angles, whereby a support frame for the perimeter of the waterbed mattress is formed; and
   a plurality of decorative panels releasably fastened to said plurality of corner members respectively.

2. The invention of claim 1 wherein said decorative panel is configured to be compatible with a desired period or style of furniture.

3. The invention of claim 1 wherein said uniform cross-sectional configuration of said wall members comprises an I-beam having upper and lower cross pieces, said upper and lower cross pieces having opposing lips forming said decorative panel support channel means.

4. The invention of claim 3 wherein a member formed of protective material is force fitted over said upper cross piece of said upstanding wall whereby said decorative frame will be protected from damage.

5. The invention of claim 1 wherein said fastening means includes a first magnetically permeated plate secured to said vertical portion of said I-beam and a second magnetically permeated plate secured to said decorative panel.

6. The invention of claim 1 wherein said fastening means includes "Velcro" type fasteners secured respectively to said vertical portion of said I-beam and said decorative panel.

7. Decorative frame for supporting the perimeter of a waterbed mattress, said frame comprising:
   a plurality of decorative panels;
   a pair of spaced upstanding elongated side wall members;
   a pair of spaced upstanding elongated end wall members for maintaining said side walls in a desired space relationship;
   corner members of uniform configuration interconnecting adjacent side and end wall members to form a substantially rectangular perimeter support frame for said waterbed mattress;
   said side wall and said end wall members being of a uniform cross-sectional configuration having a support channel for retaining at least one of said decorative panels;
   means for releasably fastening decorative panels to respective wall members; and
   means for releasably fastening decorative panels to respective corner members.

8. The invention of claim 7 wherein said uniform cross-sectional configuration of said wall members comprises an I-beam having upper and lower cross pieces, said upper and lower cross pieces having opposing lips forming said decorative panel support channel.

* * * * *